United States Patent
Zhang et al.

(10) Patent No.: US 6,396,715 B1
(45) Date of Patent: May 28, 2002

(54) DC TO DC CONVERTER FOR OPERATING IN SELECTABLE VOLTAGE MODES

(75) Inventors: Alpha J. Zhang; Guisong Huang; Yilei Gu, all of Neihu Taipei (TW)

(73) Assignee: Delta Electronics, Inc., Taipei (TW)

( * ) Notice: Subject to any disclaimer, the term of this patent is extended or adjusted under 35 U.S.C. 154(b) by 0 days.

(21) Appl. No.: 09/811,680

(22) Filed: Mar. 19, 2001

(30) Foreign Application Priority Data

Nov. 30, 2000 (TW) .......................... 89125525 A

(51) Int. Cl.[7] .............................. H02M 3/335
(52) U.S. Cl. ........................... 363/17; 363/132
(58) Field of Search ............... 363/17, 24, 25, 363/26, 131, 132, 133, 134

(56) References Cited

U.S. PATENT DOCUMENTS

| | | | |
|---|---|---|---|
| 5,568,368 A | * | 10/1996 | Steigerwald et al. .......... 363/17 |
| 5,877,951 A | * | 3/1999 | Mweene ....................... 363/98 |
| 5,930,122 A | * | 7/1999 | Moriguchi et al. ........... 363/17 |
| 5,949,658 A | * | 9/1999 | Thottuvelil et al. .......... 363/15 |
| 6,016,258 A | * | 1/2000 | Jain et al. ..................... 363/17 |
| 6,215,683 B1 | * | 4/2001 | Mao ........................... 363/142 |
| 6,246,599 B1 | * | 6/2001 | Jang et al. .................. 363/132 |
| 6,256,209 B1 | * | 7/2001 | Gurwicz et al. .............. 363/17 |

* cited by examiner

Primary Examiner—Adolf Deneke Berhane
(74) Attorney, Agent, or Firm—Volpe and Koenig, P.C.

(57) ABSTRACT

An integral DC to DC converter for converting at least one input DC voltage into at least one output DC voltage is provided. The integral DC to DC converter includes a first input capacitor and a second input capacitor for providing the at least one input DC voltage, a DC to AC circuit, a transformer, a rectifying circuit, a filtering capacitor, two input DC voltage switching elements and an output voltage switching element. The integral DC to DC converter is implemented by switching the switching elements.

6 Claims, 6 Drawing Sheets

DC TO DC CONVERTER FOR OPERATING IN SELECTABLE VOLTAGE MODES

FIELD OF THE INVENTION

The present invention relates to a DC to DC converter, and more particularly to an DC to DC converter for operating in selectable input and output voltage modes.

BACKGROUND OF THE INVENTION

FIG. 1 is a circuit diagram of a full-bridge phase-shifted soft-switching DC to DC converter according to the prior art. The DC voltage inputted into the input capacitor C11 is converted into a high frequency square-wave AC voltage through the switching devices S11 to S14 and sent to the primary winding of the transformer Tr. The secondary winding of the transformer Tr outputs two sets of square-wave alternative voltages having the same amplitudes, which are then rectified by the rectifier diode D11 and D12 and filtered by a filtering circuit composed of the inductor Lo and the capacitor C3 in series to obtain an output DC voltage. The two switching devices in the first arm of the full-bridge, i.e. S11 and S12, and the two switching devices in the second arm of the full-bridge, i.e. S13 and S14, are complementarily driven out of phase at 50% duty ratio of square-wave control signal. The output voltage is regulated by varying the phase shift of the control signal in the first arm and the control signal in the second arm. In addition, the operation efficiency of the converter could be increased by using the stored energy in the inductor Lk in the input loop of the transformer Tr to perform the soft turn-on of the switching devices S11 to S14.

FIG. 2 is a circuit diagram of an asymmetric half-bridge DC to DC converter according to the prior art. The DC voltage inputted into the input capacitor C21 is converted into a high frequency square-wave AC voltage through the switching devices S21 and S22. The DC components existing in the high frequency square-wave AC voltage is then filtered via the blocking capacitor Cb so as to send a square-wave AC voltage to the primary winding of the transformer Tr. The circuit loop in the secondary section of the transformer Tr includes rectifier diodes D21, D22, a inductor Lo and a capacitor C3, wherein the output DC voltage is regulated by varying the square-wave pulse time of the control signal of the switching devices S21, S22. In addition, the soft turn-on of the switching devices S21 and S22 is performed by using the stored energy in the inductor Lk in the input loop of the transformer Tr.

FIG. 3 is a circuit diagram of a full-bridge series-parallel resonant DC to DC converter according to the prior art. The DC voltage inputted into the capacitor C31 is converted into a high frequency square-wave AC voltage through the switching devices S31 to S34. The high frequency square-wave AC voltage is resonated by the series resonance circuit composed of a series resonant inductor Ls and a series resonant capacitor Cs and the parallel resonant circuit composed of a parallel resonant capacitor Cp and the input magnetizing inductor of the transformer Tr, thereby obtaining a sinusoidal alternative voltage as the input voltage of the transformer Tr. The circuit loop in the secondary section of the transformer Tr includes rectifier diodes D31, D32, a inductor Lo and a capacitor C3, wherein the output DC voltage is regulated by varying the switching frequency of the switching devices S31 to S34 to change the input voltage of the transformer Tr.

The DC-to-DC converters described in FIGS. 1 to 3 are suitable for the condition where the relative change of the input DC voltage and the output DC voltage is not wide. The operation performance and the converting efficiency of the DC to DC converter are decreased with the decreasing output voltage and the increasing input voltage. Furthermore, the DC to DC converter described above can be applied to the condition where only one input DC voltage is converted into one output DC voltage, which is costly and not environmentally friendly.

Therefore, the present invention provides a DC to DC converter for operating in selectable input and output modes for overcoming the problems described above.

SUMMARY OF THE INVENTION

It is an object of the present invention to provide a DC to DC converter capable of operating in selectable input voltage modes.

The DC to DC converter capable of operating in selectable input voltage modes according to the present invention includes a first input capacitor and a second input capacitor, a DC to AC circuit, a transformer, a rectifying circuit, a filtering capacitor, a first input DC voltage switching element and a second input DC voltage switching element.

In accordance with an aspect of the present invention, the first input capacitor and the second input capacitor is used for providing the at least one input DC voltage. The DC to AC circuit is connected with the first input capacitor and the second input capacitor for converting the input DC voltage to a high frequency first AC voltage and the DC to AC circuit includes four full-bridge switching devices. The transformer is used for converting the first AC voltage into a second AC voltage wherein the primary winding of the transformer is connected to the DC to AC circuit. The rectifying circuit is connected to the secondary winding of the transformer for rectifying the second AC voltage to the output DC voltage and the rectifying circuit includes four full-bridge rectifier diodes. The filtering capacitor is connected to the rectifying circuit for filtering the output DC voltage. The junction point of the first input DC voltage switching element is connected to the first input capacitor and the ends of the first input DC voltage switching element are connected with the second arm of the full-bridge switching devices. The junction point of the second input DC voltage switching element is connected to the second input capacitor and the ends of the second input DC voltage switching element are connected with the first arm of full-bridge switching devices.

Preferably, the first input capacitor is parallel with the first arm of the full-bridge switching devices and the second input capacitor is parallel with the second arm of the full-bridge switching devices.

Preferably, the rectifying circuit further comprises an output voltage switching element. The junction point of the output voltage switching element is connected to the filtering capacitor and the ends of the output voltage switching element are connected with the co-anode of the four full-bridge rectifier diodes and the central tapping head of the transformer.

Preferably, the at least one input DC voltage includes 200 V and 400 V.

It is another object of the present invention to provide a DC to DC converter for operating in selectable output voltage modes, which includes an input capacitor for providing the input DC voltage, a DC to AC circuit connected with the input capacitor for converting the input DC voltage to a high frequency first AC voltage wherein the DC to AC circuit comprises four full-bridge switching devices, a transformer for converting the first AC voltage into a second AC voltage wherein the primary winding of the transformer is connected to the DC to AC circuit, a rectifying circuit connected to the secondary winding of the transformer for rectifying the second AC voltage to the output DC voltage wherein the rectifying circuit comprises four full-bridge rectifier diodes, a filtering capacitor connected to the rectifying circuit for filtering the output DC voltage, and an output voltage switching element wherein the junction point of the output voltage switching element is connected to the filtering capacitor and the ends of the output voltage switching element are connected with the co-anode of the four full-bridge rectifier diodes and the central tapping head of the transformer.

Preferably, the output DC voltage modes are about 24 V and 48 V.

It is another object of the present invention to provide a DC to DC converter for operating in selectable input and output voltage modes, which includes a first input capacitor and a second input capacitor for providing the at least one input DC voltage, a DC to AC circuit connected with the first input capacitor and the second input capacitor for converting the input DC voltage to a high frequency first AC voltage wherein the DC to AC circuit comprises four full-bridge switching devices, a transformer for converting the first AC voltage into a second AC voltage wherein the primary winding of the transformer is connected to the DC to AC circuit, a rectifying circuit connected to the secondary winding of the transformer for rectifying the second AC voltage to the output DC voltage wherein the rectifying circuit comprises four fill-bridge rectifier diodes, a filtering capacitor connected to the rectifying circuit for filtering the output DC voltage, a first input DC voltage switching element wherein the junction point of the first input DC voltage switching element is connected to the first input capacitor and the ends of the first input DC voltage switching element are connected with the second arm, and a second input DC voltage switching element wherein the junction point of the second input DC voltage switching element is connected to the second input capacitor and the ends of the second input DC voltage switching element are connected with the first arm, and an output voltage switching element wherein the junction point of the output voltage switching element is connected to the filtering capacitor and the ends of the output voltage switching element are connected with the co-anode of the four full-bridge rectifier diodes and the central tapping head of the transformer.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENTS

Figure 4:
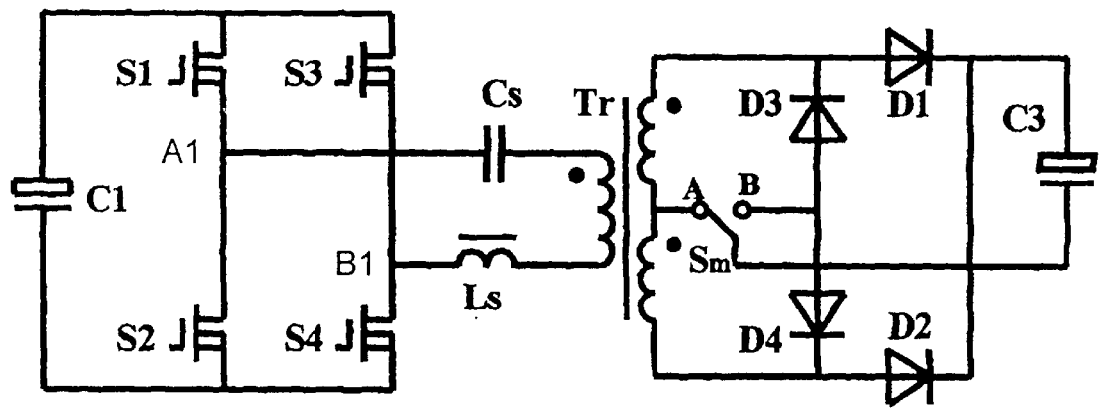
FIG. 4 is a circuit diagram of a DC to DC converter according to the first preferred embodiment of the present invention.

Referring to FIG. 4, the DC to DC converter for the first preferred embodiment of the present invention is implemented by varying the structure of the output circuit. The DC to DC converter includes an input capacitor C1, a set of full-bridge switching devices S1 to S4, a resonance circuit composed of a resonant inductor Ls and a series resonant capacitor Cs, a transformer, a rectifying circuit composed of four rectifier diodes D1 to D4, and a filtering capacitor C3. The input capacitor C1 is connected with the full-bridge switching devices S1 to S4. The operations of the full-bridge switching devices S1 to S4 are the same as those of the typical fill-bridge switching devices by being alternately conducted and shut. Therefore, the DC voltage in the input capacitor C1 is converted into a high frequency alternative voltage. The full-bridge switching devices S1 to S4 are connected with the resonance circuit composed of the resonant inductor Ls and the series resonant capacitor Cs to form a DC to AC converting circuit. Certainly, the resonant inductor Ls can be integrated with the transformer Tr.

The transformer Tr is used for electrically isolation and converting the AC voltage outputted from the DC to AC converting circuit. The converting ratio depends on the demand. The rectifying circuit composed of four rectifier diodes D1 to D4 is operated in a full-bridge scheme. The converter circuit according to the present invention further includes an output voltage switching element Sm, wherein one end of the output voltage switching element Sm is connected to the co-anode of the four full-bridge rectifier diodes D1 to D4 and the other end of output voltage switching element Sm is connected to the central tapping head of the transformer Tr. The co-cathode of the tapping head of the transformer Tr is connected to the filtering capacitor C3.

Figure 5A:
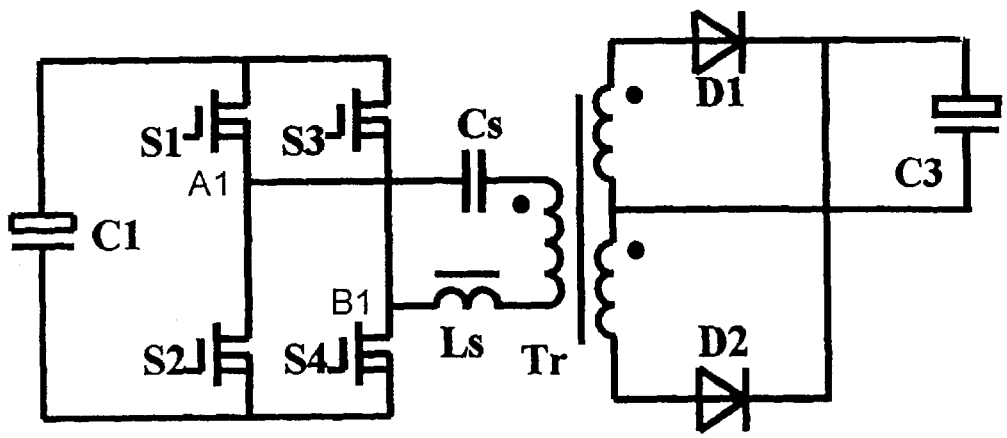
FIG. 5A is a circuit diagram illustrating the switching element of the rectifying circuit in FIG. 4 is switched to the junction point A.
Figure 5B:
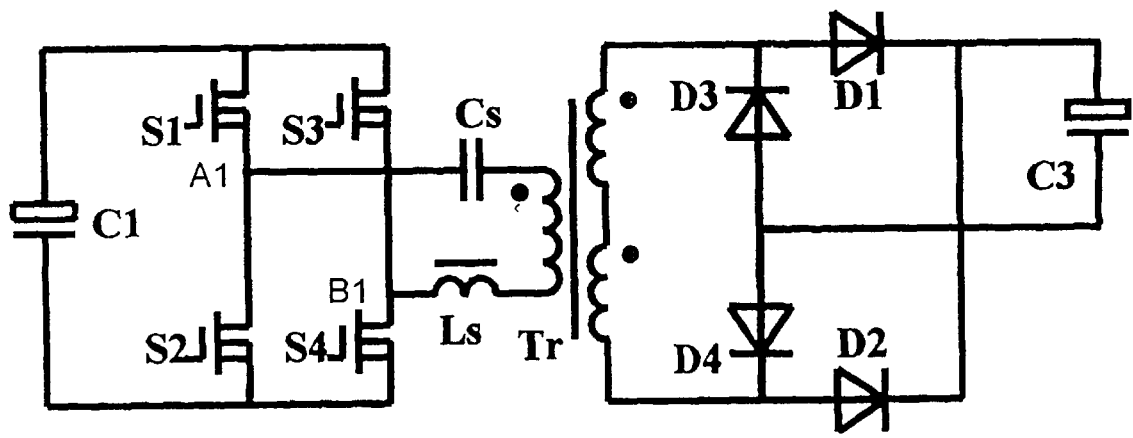
FIG. 5B is a circuit diagram illustrating the switching element of the rectifying circuit in FIG. 4 is switched to the junction point B.

The operation principle of the full-bridge rectifying circuit of the DC to DC converter shown in FIG. 4 will be explained in more detail below. The full-bridge switching devices in the first bridge arm, i.e. S1 and S2, are complementarily conducted and shut by a control signal. The full-bridge switching devices in the second bridge arm, i.e. S3 and S4, are complementarily conducted and shut by a corresponding control signal. The DC voltage in the input capacitor C1 is converted through the switching devices S1 to S4 to obtain a high frequency square-wave AC voltage between the midpoint of the first bridge arm, i.e. A1, and the midpoint of the second bridge arm, i.e. B1. The high frequency square-wave AC voltage is applied to the series resonance circuit composed of the series resonant capacitor Cs, the primary winding of the transformer Tr and the series resonant inductor Ls to generate a series resonance, thereby forming a sinusoidal AC current in the primary winding of the transformer Tr. The sinusoidal AC current is then transferred into the upper and lower secondary windings of the transformer Tr and sent to the rectifying circuit composed of diodes D1 to D4. If the output voltage switching element Sm is switched to the point A, the alternative current outputted from the transformer T r will pass through the rectifier diodes D1 and D2, as can be seen in FIG. 5A; if the output voltage switching element Sm is switched to the point B, the alternative current outputted from the transformer Tr will pass through the rectifier diodes D1 to D4, as can be seen in FIG. 5B. Subsequently, the rectified voltage is sent to the filtering capacitor C3 for being filtered into the output DC voltage. Because the output DC voltage is rectified by passing through the rectifier diodes D1 and D2 when the output switching element Sm is switched to the point A, the amplitude of the output DC voltage depends on the voltage amplitude of the upper or lower secondary winding of the transformer Tr. Because the output DC voltage is rectified by passing through the rectifier diodes D1, D4 and D2, D3 when the output voltage switching element Sm is switched to the point B, the amplitude of the output DC voltage is the summation of the voltage amplitudes outputted from the upper and the lower secondary windings of the transformer Tr. Thus, the output DC voltage in the case the output voltage switching element Sm is switched to point A is a half of that in the case the switching element Sm is switched to the point B. In another words, the output DC voltage in the case the output voltage switching element Sm is switched to the point B is twice as big as that in the case the output switching element Sm is switched to the point A. It is apparent that two output DC voltages can be achieved in the DC to DC converter according to the present invention by adjusting the output voltage switching element Sm. For example, the two customarily used direct voltages 24 V and 48 V for communication power supply can be obtained by using only one DC to DC converter according to the present invention.

Figure 6:
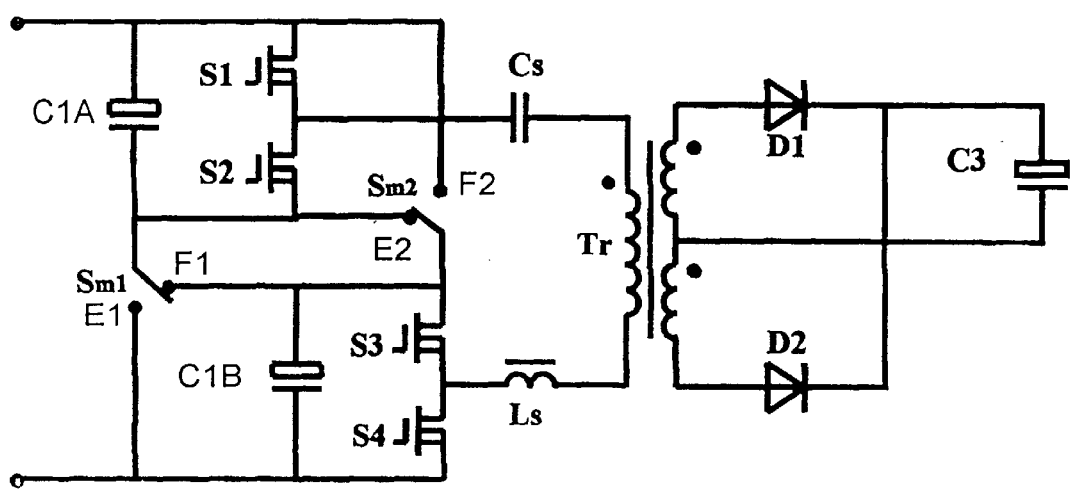
FIG. 6 is a circuit diagram of a DC to DC converter according to the second preferred embodiment of the present invention.

Referring to FIG. 6, the DC to DC converter for the second preferred embodiment of the present invention is implemented by varying the structure of the input circuit. In this embodiment, the DC to DC converter includes two input capacitor C1A and C1B, four full-bridge switching devices S1 to S4, two input voltage switching elements Sm1 and Sm2. The first input capacitor C1A is in parallel with the full-bridge switching devices in the first bridge arm, i.e. S1 and S2, and the second input capacitor C1B is in parallel with the full-bridge switching devices in the second bridge arm, i.e. S3 and S4. The junction point of the first input voltage switching element Sm1 is connected with the first input capacitor C1A, and the ends of the first input voltage switching element Sm1 are connected with the second bridge arm. The junction point of the second input voltage switching element Sm2 is connected with the second input capacitor C1B, and the ends of the second input voltage switching element Sm2 are connected with the first bridge arm.

Figure 1:
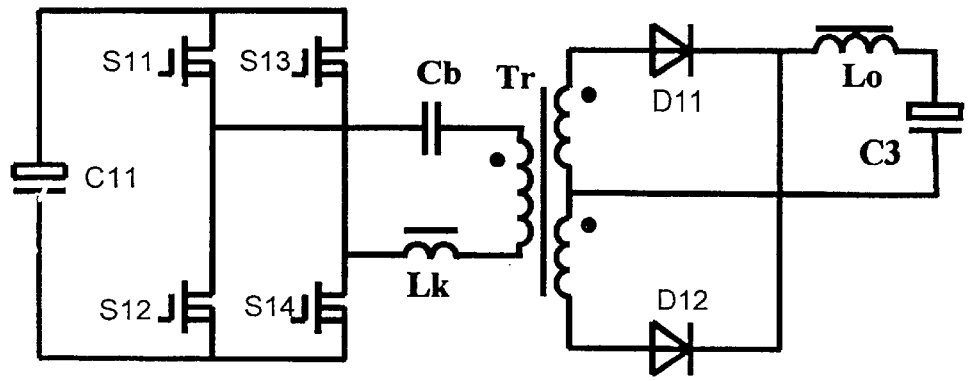
FIG. 1 is a circuit diagram of a full-bridge phase-shifted soft-switching DC to DC converter according to the prior art.
Figure 2:
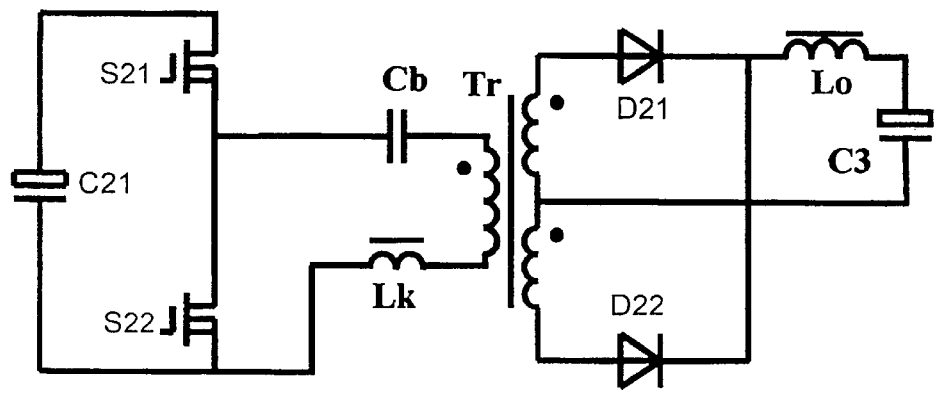
FIG. 2 is a circuit diagram of an asymmetric half-bridge DC to DC converter according to the prior art.
Figure 3:
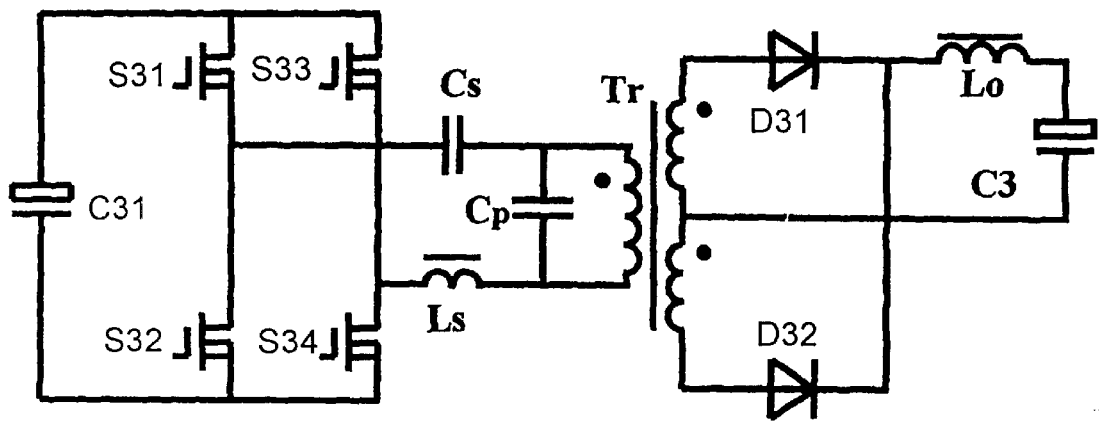
FIG. 3 is a circuit diagram of a full-bridge serial-parallel resonant DC to DC converter according to the prior art.
Figure 7A:
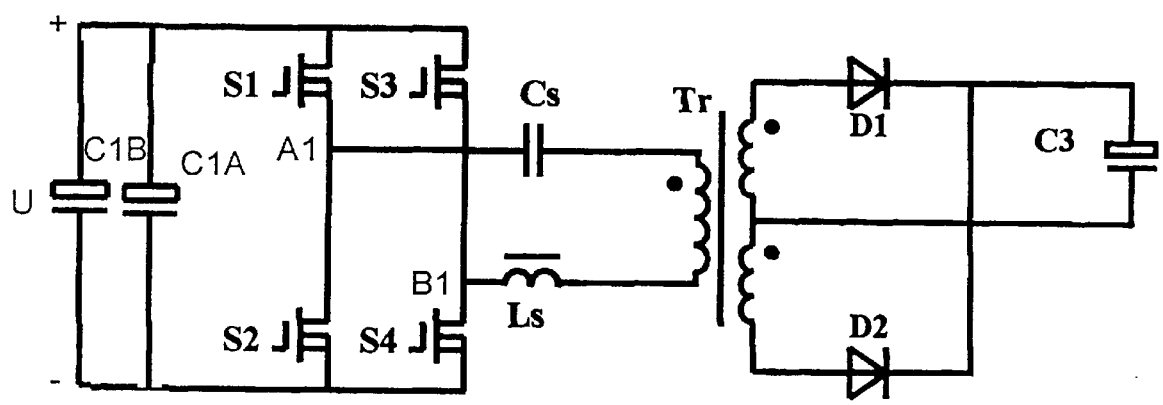
FIG. 7A is a circuit diagram illustrating the first input DC voltage switching element in FIG. 6 is switched to the junction point E1 and the second input DC voltage switching element is switched to the junction point F2.

The operation principle of the DC to DC converter shown in FIG. 6 will be explained in more detail below. When the first input voltage switching element Sm1 and the second input voltage switching element Sm2 are switched to the positions E1 and F2 respectively, the second input capacitor C1B is in parallel with the first input capacitor C1A, as can be seen in FIG. 7A. Referring to FIG. 7A, the circuit structure and the operation principle are the same as those in FIG. 1 except that the input capacitor C1 is replaced by the first input capacitor C1A in parallel with the second input capacitor C1B. The voltage amplitude between the midpoint point of the first bridge arm, i.e. A1, and the midpoint of the second bridge arm, i.e. A2, is the same as the voltage amplitude of the first input capacitor C1A or the second input capacitor C1B which is equal to the input direct voltage U.

Figure 7B:
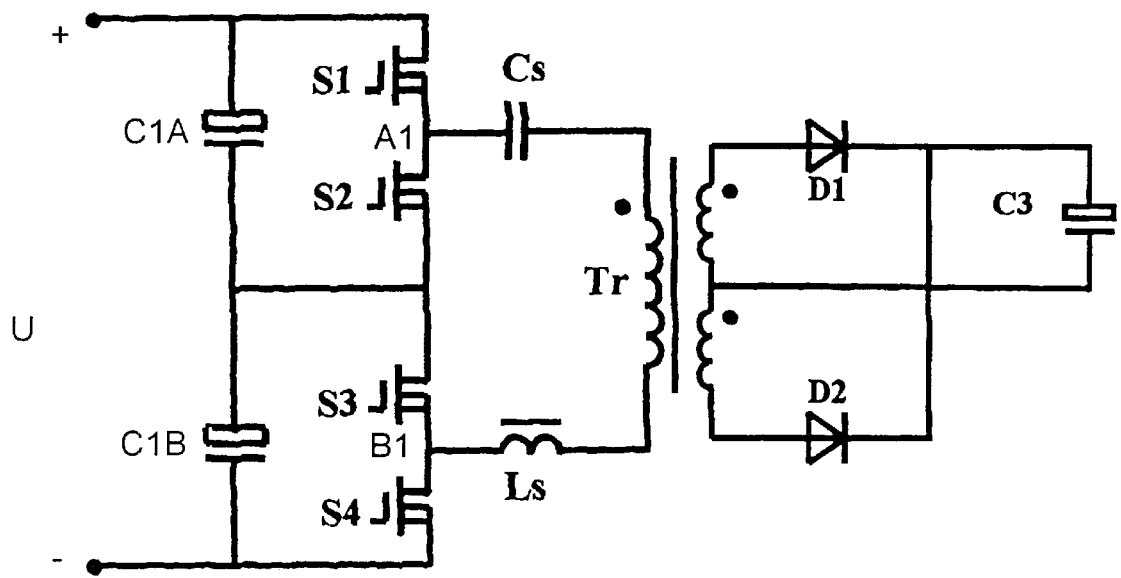
FIG. 7B is a circuit diagram illustrating the first DC voltage switching element in FIG. 6 is switched to the junction point F1 and the second input DC voltage switching element is switched to the junction point E2.

When the fist input voltage switching element Sm1 and the second input voltage switching element Sm2 in FIG. 6 are switched to the positions F1 and E2 respectively, the second input capacitor C1B is in series with the first input capacitor C1A, as can be seen in FIG. 7B. Referring to FIG. 7B, the first input capacitor C1A provides voltage to the first bridge arm which is composed of the switching devices S1 and S2, and the second input capacitor C1B provides voltage to the second bridge arm which is composed of the switching device S3 and S4. Because the first input capacitor C1A is in series with the second input capacitor C1B, each of the voltage amplitude in the first input capacitor C1A and the voltage amplitude in the second input capacitor C1B is equal to half the voltage amplitude of input direct voltage U, i.e. ½U.

It is apparent that two different input DC voltages can be applied to achieve an equal output DC voltage according to the DC to DC converter of the present invention by adjusting the input switching elements Sm1 and Sm2. For example, the customarily used voltage 24 V for communication power supply can be obtained by converting two input voltages 200 V and 400 V according to the present invention.

Figure 8:
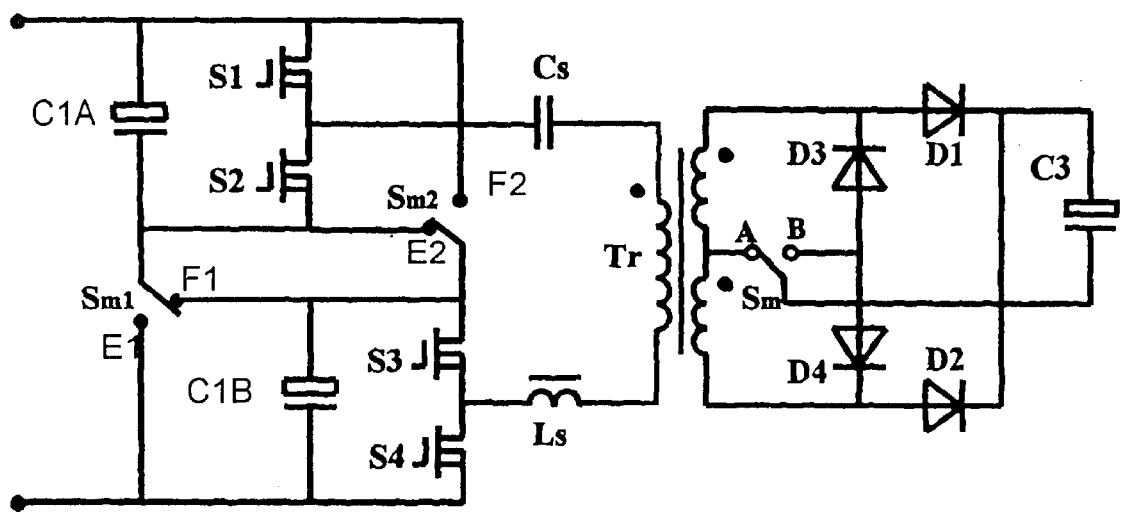
FIG. 8 is a circuit diagram of a DC to DC converter according to the third preferred embodiment of the present invention.

The circuit shown in FIG. 4 is provided for converting DC voltage by varying the output circuit. The circuit shown in FIG. 6 is provided for converting DC voltage by varying the input circuit. FIG. 8 shows the third preferred embodiment of the present invention in combination of the circuit in FIG. 4 and the circuit in FIG. 6. The operation principle is the same as the foregoing explanation in FIGS. 4 to 7.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structure.

What is claimed is:

1. A DC to DC converter having selectable input voltage modes of operation, comprising:

a first input capacitor and a second input capacitor for providing an input DC voltage;

a DC to AC circuit having four full-bridge switching devices for converting said input DC voltage to a high frequency first AC voltage wherein said four full-bridge switching devices have a first arm electrically connected in parallel with said first input capacitor and a second arm electrically connected in parallel with said second input capacitor;

a transformer for converting said first AC voltage into a second AC voltage wherein the primary winding of said transformer is connected to said DC to AC circuit;

a rectifying circuit connected to the secondary winding of said transformer for rectifying said second AC voltage to an output DC voltage;

a filtering capacitor connected to said rectifying circuit for filtering said output DC voltage;

a first input DC voltage switching element electrically connected to said first input capacitor and said second arm of said full-bridge switching devices; and a second input DC voltage switching element electrically connected to said second input capacitor and said first arm of said full-bridge switching devices, wherein said selectable input voltage modes of operation have a first mode for forming said first input capacitor in parallel with said second input capacitor and a second mode for forming said first input capacitor in series with said second input capacitor by said first input DC voltage switching element and said second input DC voltage switching element.

2. The DC to DC converter according to claim 1, wherein said first and second modes are a low voltage mode and a high voltage mode, respectively.

3. The integral DC to DC converter according to claim 1, wherein said rectifying circuit further comprises an output voltage switching element.

4. The integral DC to DC converter according to claim 3, wherein the junction point of said output voltage switching element is connected to said filtering capacitor and the ends of said output voltage switching element are connected with the co-anode of said four full-bridge rectifier diodes and the central tapping head of said transformer.

5. A DC to DC converter having selectable output voltage modes of operation, comprising:

an input capacitor for providing an input DC voltage;

a DC to AC circuit connected with said input capacitor for converting said input DC voltage to a high frequency first AC voltage;

a transformer for converting said first AC voltage into a second AC voltage wherein the primary winding of said transformer is connected to said DC to AC circuit;

a rectifying circuit having four rectifier diodes connected to the secondary winding of said transformer for rectifying said second AC voltage to an output DC voltage;

a filtering capacitor connected to said rectifying circuit for filtering said output DC voltage; and an output voltage switching element electrically connected to said filtering capacitor, said rectifier diodes, and the central tap of said transformer, wherein said selectable output voltage modes of operation have a first mode for coupling said filtering capacitor, said rectifier diodes, and the central tap of said transformer together as a half-bridge converter and a second mode for coupling said filtering capacitor, said rectifier diodes, and said transformer together as a fill-bridge converter by said output voltage switching element.

6. A DC to DC converter having selectable input and output voltage modes of operation, comprising:

a first input capacitor and a second input capacitor for providing an input DC voltage;

a DC to AC circuit having four full-bridge switching devices for converting said input DC voltage to a high frequency first AC voltage wherein said four full-bridge switching devices have a first arm electrically connected in parallel with said first input capacitor and a second arm electrically connected in parallel with said second input capacitor;

a transformer for converting said first AC voltage into a second AC voltage wherein the primary winding of said transformer is connected to said DC to AC circuit;

a rectifying circuit having four rectifier diodes connected to the secondary winding of said transformer for rectifying said second AC voltage to an output DC voltage;

a filtering capacitor connected to said rectifying circuit for filtering said output DC voltage;

a first input DC voltage switching element electrically connected to said first input capacitor and said second arm of said full-bridge switching devices;

a second input DC voltage switching element electrically connected to said second input capacitor and said first arm of said full-bridge switching devices, wherein said selectable input voltage modes of operation have a first mode for forming said first input capacitor in parallel with said second input capacitor and a second mode for forming said first input capacitor in series with said second input capacitor by said first input DC voltage switching element and said second input DC voltage switching element; and an output voltage switching element electrically connected to said filtering capacitor, said rectifier diodes, and the central tap of said transformer, wherein said selectable output voltage modes of operation have a first mode for coupling said filtering capacitor, said rectifier diodes, and the central tap of said transformer together as a half-bridge converter and a second mode for coupling said filtering capacitor, said rectifier diodes, and said transformer together as a full-bridge converter by said output voltage switching element.

* * * * *